Inventor
Edward L. Dix

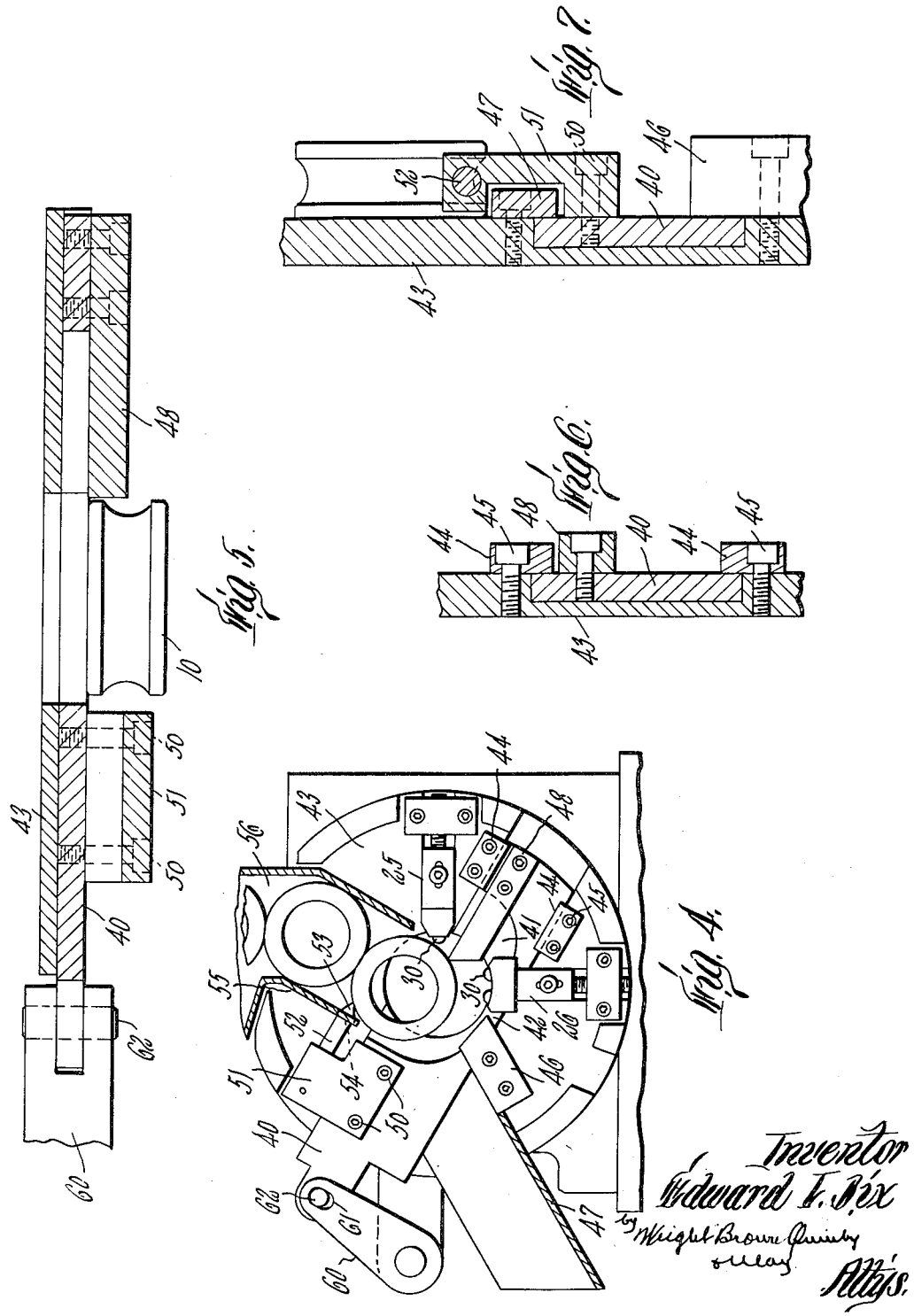

United States Patent Office 2,706,369
Patented Apr. 19, 1955

2,706,369

CENTERLESS GRINDING MACHINE WITH LOADING AND UNLOADING MECHANISM

Edward L. Dix, Chester, Vt., assignor to Bryant Chucking Grinder Company, Springfield, Vt., a corporation of Vermont Application May 7, 1953, Serial No. 353,526

3 Claims. (Cl. 51—236)

This invention relates to centerless grinding machines provided with mechanism by which ground work pieces may be unloaded and be replaced by unground work pieces in grinding position.

It has for an object to provide a simple mechanism by which with a single motion a work piece is unloaded and a piece to be ground is loaded with respect to the grinding mechanism.

More especially the invention is shown herein as embodied in a machine adapted to grind the inner faces of annular internal ball raceway members coaxially with the ball grooves and external peripheries thereof.

For a complete understanding of the invention, reference may be had to the accompanying drawings in which Figure 1 is a view partly in side elevation and partly broken away and in section of the grinding head of a centerless grinder embodying the invention.

Figure 2 is a sectional view on line 2—2 of Figure 1.

Figure 4 is a fragmentary view similar to portions of Figures 2 and 3, but showing the loading and unloading mechanism in a later stage of its operative cycle.

Figures 5, 6 and 7 are detail sectional views on the correspondingly numbered section lines of Figure 2.

Figure 1:
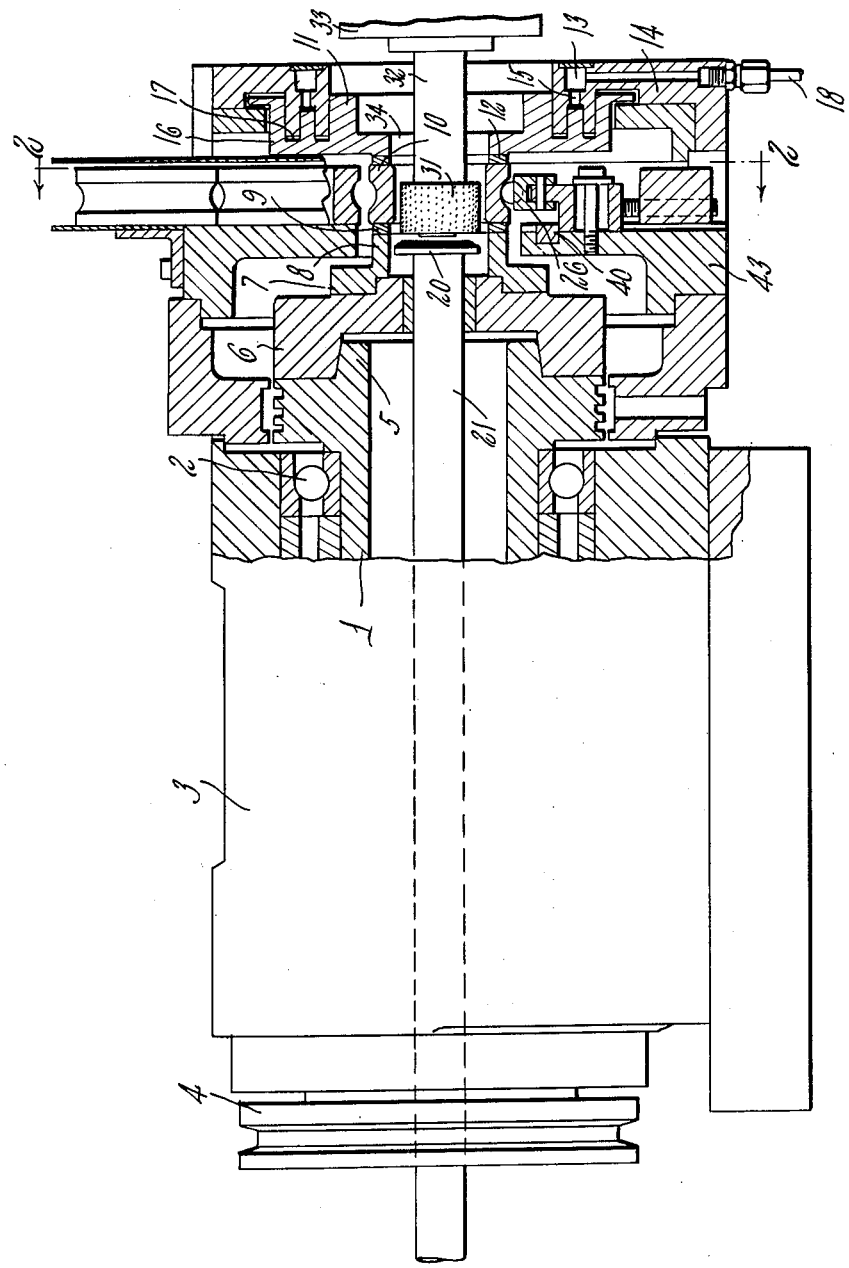

Referring to Figure 1, at 1 is shown a hollow work spindle mounted for rotation in bearings, one of which is shown at 2, within a work head 3. The rear end of the spindle 1 may have suitable means for rotating it, as, for example, a belt pulley 4. The forward end of the spindle is provided with a standard nose at 5 to which may be secured a face plate 6. As shown this face plate has a forwardly extending work-engaging member portion 7 having an end face 8 provided with a ring member 9, the outer face of which is transverse to the axis of the spindle and against which a work piece 10 may be pressed.

As shown, this pressing action is produced by a work clamp 11 having a ring portion 12 which may be engaged with the opposite face of the work piece 10 and press it against the ring member 8. This clamp may be moved into pressing position or released therefrom by any suitable means, but as herein shown this is accomplished by fluid pressure which is introduced through a pipe 18 into an annular chamber 13 in a stationary annular member 14. From this annular chamber 13 air may find its way in between the member 14 and the clamp 11 through suitable ports 15, the confronting faces of the clamp 10 and the stationary member 14 being provided with interengaging annular ribs and depressions 16 and 17 which act as a labyrinth packing between these elements.

Figure 3:
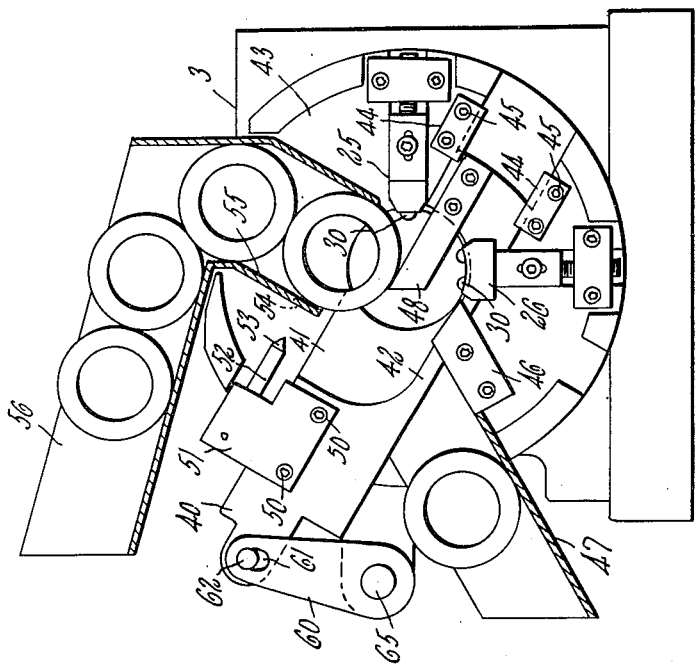
Figure 3 is a view similar to Figure 2, but showing the mechanism in position with the ground work piece ejected and the unground work piece about to be deposited in grinding position.
Figure 6:
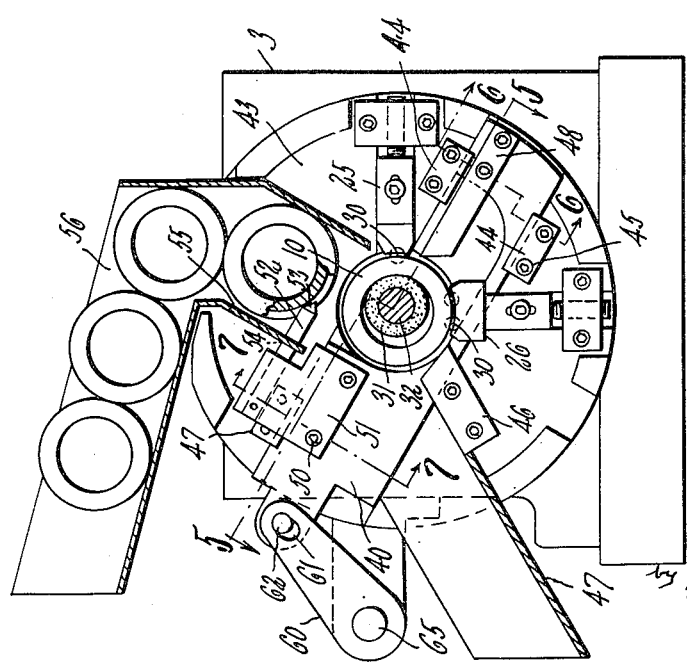

As shown herein, also, a plug gage 20 is carried by an axially movable bar 21 coaxial with the spindle 1, and at suitable times this gage 20 may be moved against the work piece, which, when its interior surface has been ground to the proper size, allows the gage to pass therewithin and show that the grinding operation has been completed. The arrangement of the work piece, clamp, and gage is that shown and claimed in my application Serial No. 366,217, filed July 6, 1953, the work piece being mounted concentrically with the spindle, while the clamp 11 is eccentric in such a relation that when it is rotated with the spindle it exerts a component of force against the work piece which holds it against a pair of shoes 25 and 26 shown best in Figures 2, 3 and 4. The concentric holding of the work piece is not essential, however, unless automatic sizing of the bore using the gage described in that application is desired, as the work piece may be arranged eccentric to the spindle in such a manner that its engagement with the face plate tends to hold it against the shoes 25 and 26. This is as described and claimed in the Arms et al. Patent No. 2,635,395 granted April 21, 1953, for Machine for Grinding Internal Surfaces Concentric with External Surfaces.

As shown the shoes 25 and 26 are adjustable radially so as to support the annular work piece from its finished external periphery in the desired relationship to the spindle axis, whether concentric or eccentric therewith. As shown, the work piece is the inner raceway of a ball bearing and the shoes are therefore shown as carrying ball contacts 30 which enter the ball groove in the outer periphery of the work piece.

A grinding wheel 31 carried on a spindle 32 in a wheel head 33 may be brought into grinding engagement with the inner face of the work piece, being passed through a central opening 34 through the stationary member 14 and the clamp 11 and into and out of engagement with the work piece.

The mechanism to which this invention is more particularly directed comprises a slide 40 mounted for lateral motion between the face plate and the clamp. As shown it is mounted at an inclination to the horizontal, although such inclination is not essential. It has a thin portion 41 along one side with a thickened rib 42 along its lower edge. It is mounted for sliding motion in a stationary member 43 having a way formed to receive it in which it is held by a pair of plates 44 which overlap its margins and which are secured to the member 43 as by the screws 45. It is also held by a plate 46, the inner edge of which overlaps the outer face of the slide (see Figure 2) and by a plate 47 engaging over its upper edge similarly to the upper plate 44. To its outer face it has fixed an ejector bar 48, which, when the slide is at its inner and outer position clears the work piece positioned opposite to its thin portion 41 as shown in Figure 2, but which when the slide is moved upwardly into the position of Figure 3, engages the work piece and projects it over the edge of the plate 46 and into the upper end of a discharge chute 47 leading away from the machine, and through which the pieces after being ground are discharged.

To the upper edge of the plate 40 there is secured, as by the screws 50, a bracket 51 which carries an inwardly and downwardly extending pin 52 having a tapered inner end 53. This end is adapted to be passed through a hole 54 in the side wall 55 of a supply chute 56 within which articles to be ground internally are supplied. When the slide 40 is in its inner and downward position of Figure 2, the portion 53 engages beneath and obstructs the descent of the lowest article within the supply chute 56, and holds it out of contact with an article in grinding position. When this slide is pulled outwardly and upwardly, the ejector 48 engages the work piece in grinding position and discharges it into the chute 47 and at the same time moves under the next work piece, which is the lowest in the chute 56, and holds it out of grinding position until as the slide 40 is moved inwardly and downwardly it passes out from beneath the lowest article in the chute 56 as the pin 52 passes through the opening 54 into position to engage the next higher article within the chute and hold it in the position shown in Figure 2.

The motion of the slide is produced by the rocking of an arm 60 having a slot 61 at its upper end which engages a pin 62 secured to and extended forwardly from the plate 40. This arm 60 is carried by a rock shaft 65 which is rocked by any suitable means in proper timed relation so that the slide is given an upward and outward stroke to eject the work piece and then a downward stroke to permit another to drop into grinding position before the succeeding grinding operation.

From the foregoing description of an embodiment of this invention it should be evident to those skilled in the art that various changes and modifications may be made without departing from its spirit or scope.

I claim:

1. In combination with a rotary spindle having a face plate at one end presenting a face transverse to the axis of said spindle and against which a work piece may be held, a clamp spaced from said face plate and operatively engageable with the opposite face of the work piece for holding said work piece against said face plate, means between said face plate and clamp and supporting the outer peripheral face of the work piece, a downwardly inclined discharge chute adjacent to one side of said work supporting means, a supply chute positioned to guide a work piece between said face plate and clamp and downwardly against said supporting means, a slide movable between said face plate and clamp for lateral motion from said supporting means to said discharge chute, a separator element fixed to said slide and positioned to enter said supply chute below the lowest work piece therein when said slide is inward and to be retracted from said supply chute when said slide is outward, a second element fixed to said slide spaced from a work piece in grinding position between said face plate and clamp and engaging said supporting means when said slide is in and engaging and lifting said work piece from said supporting means and projecting it into the upper end of said discharge chute when said slide is out, and means for moving said slide.

2. In combination with a rotary spindle having a face plate at one end presenting a face transverse to the axis of said spindle and against which a work piece may be held, a clamp spaced from said face plate and operatively engageable with the opposite face of the work piece for holding said work piece against said face plate, means between said face plate and clamp and supporting the outer peripheral face of the work piece, a downwardly inclined discharge chute adjacent to one side of said work supporting means, a supply chute positioned to guide a work piece between said face plate and clamp and downwardly against said supporting means, a slide movable between said face plate and clamp for lateral motion from said supporting means to said discharge chute, a separator element fixed to said slide and positioned to enter said supply chute below the lowest work piece therein when said slide is inward and to be retracted from said supply chute when said slide is outward, a second element fixed to said slide spaced from a work piece in grinding position between said face plate and clamp and engaging said supporting means when said slide is in and engaging and lifting said work piece from said supporting means and projecting it into the upper end of said discharge chute when said slide is out, said second element obstructing the descent of such work piece in said supply chute above said position, and means for moving said slide.

3. In combination with a rotary spindle having a face plate at one end presenting a face transverse to the axis of said spindle and against which a work piece may be held, a clamp spaced from said face plate and operatively engageable with the opposite face of the work piece for holding said work piece against said face plate, means between said face plate and clamp and supporting the outer peripheral face of the work piece, a downwardly inclined discharge chute adjacent to one side of said work supporting means, a supply chute positioned to guide a work piece between said face plate and clamp and downwardly against said supporting means, a slide mounted between said face plate and clamp and having upwardly and laterally inclined motion from said supporting means to said discharge chute, a work piece separator element fixed to said slide and entering said supply chute below the lowest work piece therein when said slide is lowered and retracted from said supply chute when said slide is raised, a second element fixed to said slide spaced from a work piece in grinding position between said face plate and clamp when said slide is down and engaging and lifting said work piece from said supporting means and projecting it into the upper end of said discharge chute when said slide is lifted, and in position to stop the descent of the lowest article in said supply chute.

References Cited in the file of this patent

UNITED STATES PATENTS

| | | |
|---|---|---|
| 2,059,895 | Norton et al. | Nov. 3, 1936 |
| 2,329,301 | Schmidt et al. | Sept. 14, 1943 |
| 2,356,226 | Delahan et al. | Aug. 22, 1944 |
| 2,546,752 | Johnson | Mar. 27, 1951 |
| 2,635,395 | Arms et al. | Apr. 21, 1953 |